United States Patent [19]

Kelly et al.

[11] 4,097,321

[45] Jun. 27, 1978

[54] MACHINE FOR SPIRALLY WRAPPING A CONTINUOUS ELEMENT AROUND AN ANNULAR TIRE BEAD

[75] Inventors: Emmett J. Kelly; Leonard R. Smith, both of Topeka, Kans.

[73] Assignee: The Goodyear Tire & Rubber Company, Akron, Ohio

[21] Appl. No.: 714,862

[22] Filed: Aug. 16, 1976

[51] Int. Cl.² .............................................. B29H 17/32
[52] U.S. Cl. .................................... 156/136; 156/195; 156/366; 156/422; 156/460; 242/4 B
[58] Field of Search ............... 156/110, 123, 135, 136, 156/141, 185, 195, 352, 353, 366, 368, 422, 425, 459, 460; 242/1.1 A, 4 R, 4 B, 4 BE, 4 C

[56] References Cited
U.S. PATENT DOCUMENTS

| | | | |
|---|---|---|---|
| 2,529,859 | 11/1950 | Ambler et al. | 156/460 |
| 3,330,491 | 7/1967 | Williams | 156/422 |
| 3,414,451 | 12/1968 | Sejda | 156/422 |
| 3,718,523 | 2/1973 | Mallory et al. | 156/460 |
| 3,853,667 | 12/1974 | Polshikov et al. | 156/460 |
| 3,966,131 | 6/1976 | LaBoda | 156/422 |

*Primary Examiner*—William A. Powell
*Assistant Examiner*—John E. Kittle
*Attorney, Agent, or Firm*—R. S. Washburn

[57] ABSTRACT

A machine for spirally wrapping a continuous element, such as a cord or tape, around an annular tire bead. The machine is provided with a mechanism for holding a tire bead and rotating it in a fixed plane and at a predetermined speed, while a device with the element rotates about the rotating bead to wrap a portion of the continuous element around the bead at a speed which is correlated to the rotational speed of the tire bead so that the finished tire bead has a predetermined spiral wrap which can be varied by changing the relative rotational speeds of the tire bead and element about the tire bead. The machine is supplied with a braking mechanism which is designed to cushion the stop of the bead wrapping mechanism, rather than bringing it to an abrupt halt, and to bring the bead wrapping mechanism always to a halt at a desired position for beginning the wrapping of another bead. A knife is furnished for cutting the continuous element after the bead wrapping operation is completed and the machine is stopped. One of the cut ends of the continuous element is held adjacent the knife, thereby eliminating the need for an operator to reach into the machine to remove the loose end for wrapping around a newly positioned bead in the machine.

10 Claims, 6 Drawing Figures

MACHINE FOR SPIRALLY WRAPPING A CONTINUOUS ELEMENT AROUND AN ANNULAR TIRE BEAD

BACKGROUND OF THE INVENTION

The invention is designed for use in a machine which spirally wraps a cord or tape around an annular tire bead used in the building of pneumatic tires. Machines of this type operate at extremely high speeds and it is difficult to stop operation of the machine at a point where the bead wrapping apparatus comes to a halt at a particular desired position which does not necessitate resetting of the machine for wrapping another bead. Such machines presently use what might be termed positive braking action, where a sharply defined abutment of a moving member abruptly comes to a halt against the rigid stop of a stationary member. The abrupt halt of a rotating member when such braking action is applied has a shattering effect upon the machine. It is desired to bring the machine to a quick, but gentle halt by cushioning the stoppage of the rotating parts of the machine. The invention is designed to accomplish this.

Briefly stated, the invention is in a machine for spirally wrapping a continuous element, such as a cord or tape, around an annular tire bead. The machine comprises a series of inter-related and connected moving parts, one of which is an apparatus for wrapping the continuous element around a rotating tire bead. A braking mechanism is provided to bring the bead-wrapping apparatus to a cushioned halt. The braking mechanism comprises a conventional electro-brake type device for slowing down the rotation of the bead-wrapping apparatus, and a latching mechanism which takes over and brings the bead-wrapping apparatus to a halt at a desired position for wrapping another bead.

DESCRIPTION OF THE DRAWING

The following description of the invention will be better understood by having reference to the annexed drawing, wherein.

ENVIRONMENT OF THE INVENTION

Figure 1:
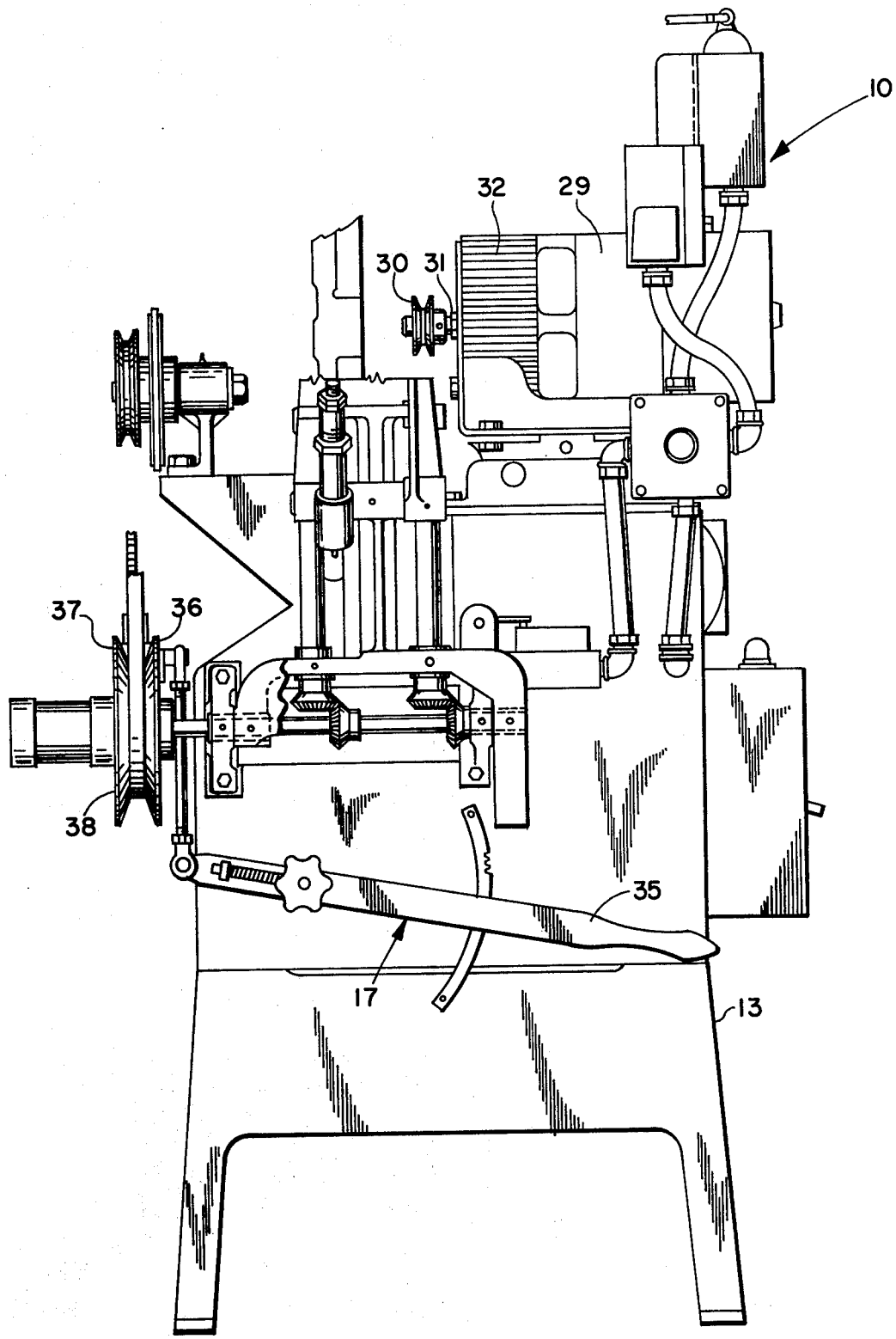
FIG. 1 is a front view of a bead-wrapping machine made in accordance with the invention.
Figure 2:
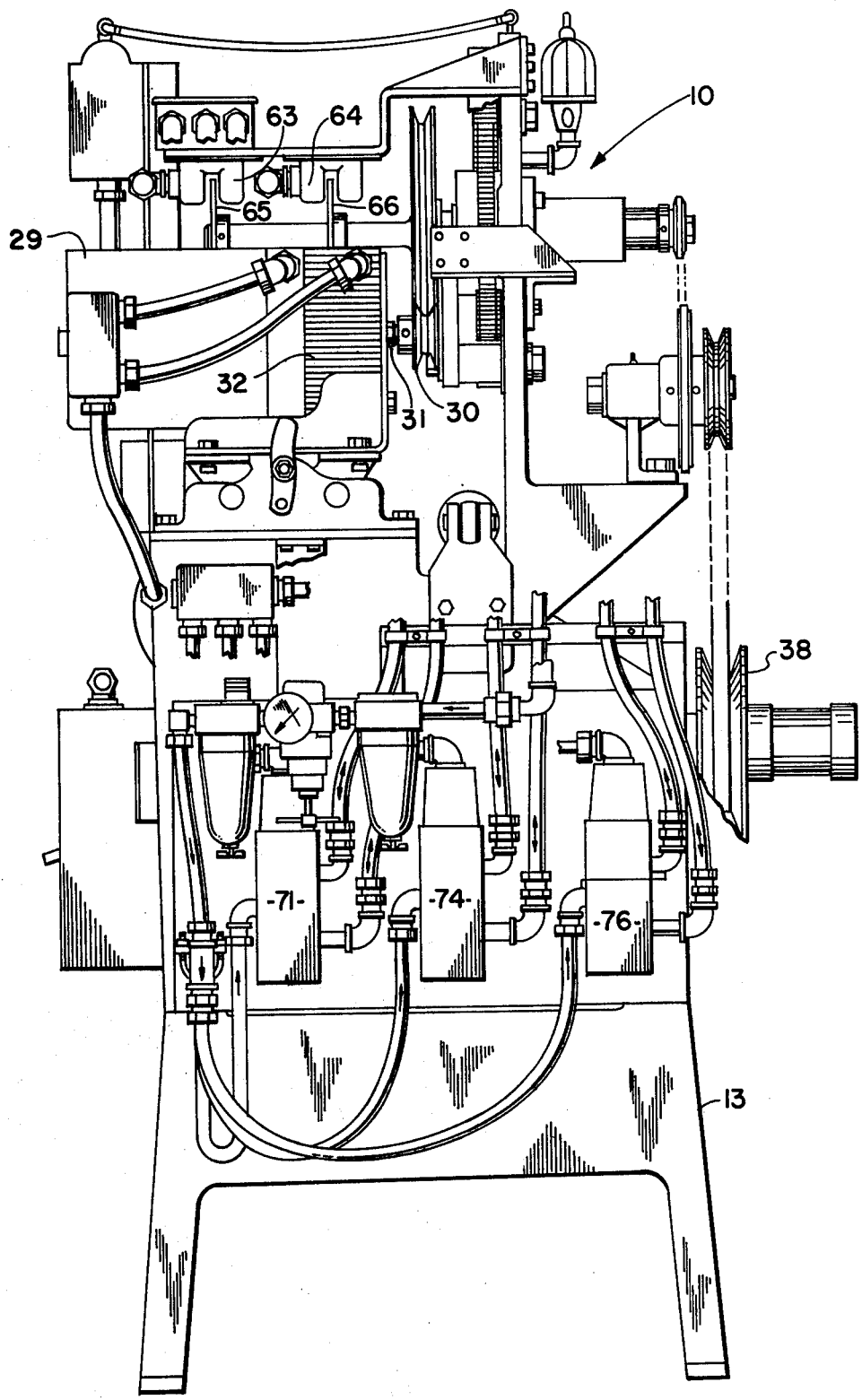
FIG. 2 is a rear view of the machine.

With reference to FIGS. 1–4, there is shown a machine 10 for spirally wrapping a continuous element 11, such as a cord or tape, around an annular tire bead 12. The machine 10 essentially comprises a machine stand 13 for supporting an assembly 14 for holding and rotating the tire bead 12, an assembly 15 for holding and wrapping the continuous element 11 around the rotating bead 12, an assembly 16 for braking and stopping operation of the machine 10, an assembly 17 for controlling the rotational speed of the tire bead 12, an assembly 18 for regulating the speed at which the continuous element 11 is wrapped around the rotating tire bead 12, and an assembly 19 for cutting the continuous element 11 after the wrapping operation is completed.

Assembly for Rotating the Tire Beads

The assembly 14 for holding and rotating the tire bead 12, hereafter referred to as the bead rotating assembly or BRA 14, comprises a shaft 20 with a rotatable head 21. The shaft 20 is pivotally mounted on the machine stand 13, so that the head 20 can be rotated to and from the assembly 15 for wrapping the continuous element 11 around the tire bead 12. A spring-biased flange roll 22 is pivotally mounted on the shaft 20 for rotation to and from the rotatable head 21. The flange roll 22 carries a cam follower 23 for engaging a cam 24 projecting from the machine stand 13 to cause rotation of the flange roll 22 into compressive engagement with the tire bead 12 when it is positioned on the machine 10 between the flange roll 22 and the rotatable head 21. The tire bead 12 is rotated in a fixed plane and at a predetermined desired speed corresponding to the rotational speed of the rotating head 21. The BRA 14 carries a pin 25 for engaging and actuating a conventional limit switch 26 on the machine stand 13. An air cylinder 27 and reciprocating piston 28 are coupled between the machine stand 13 and the shaft 20 to rotate the BRA 14.

Figure 4:
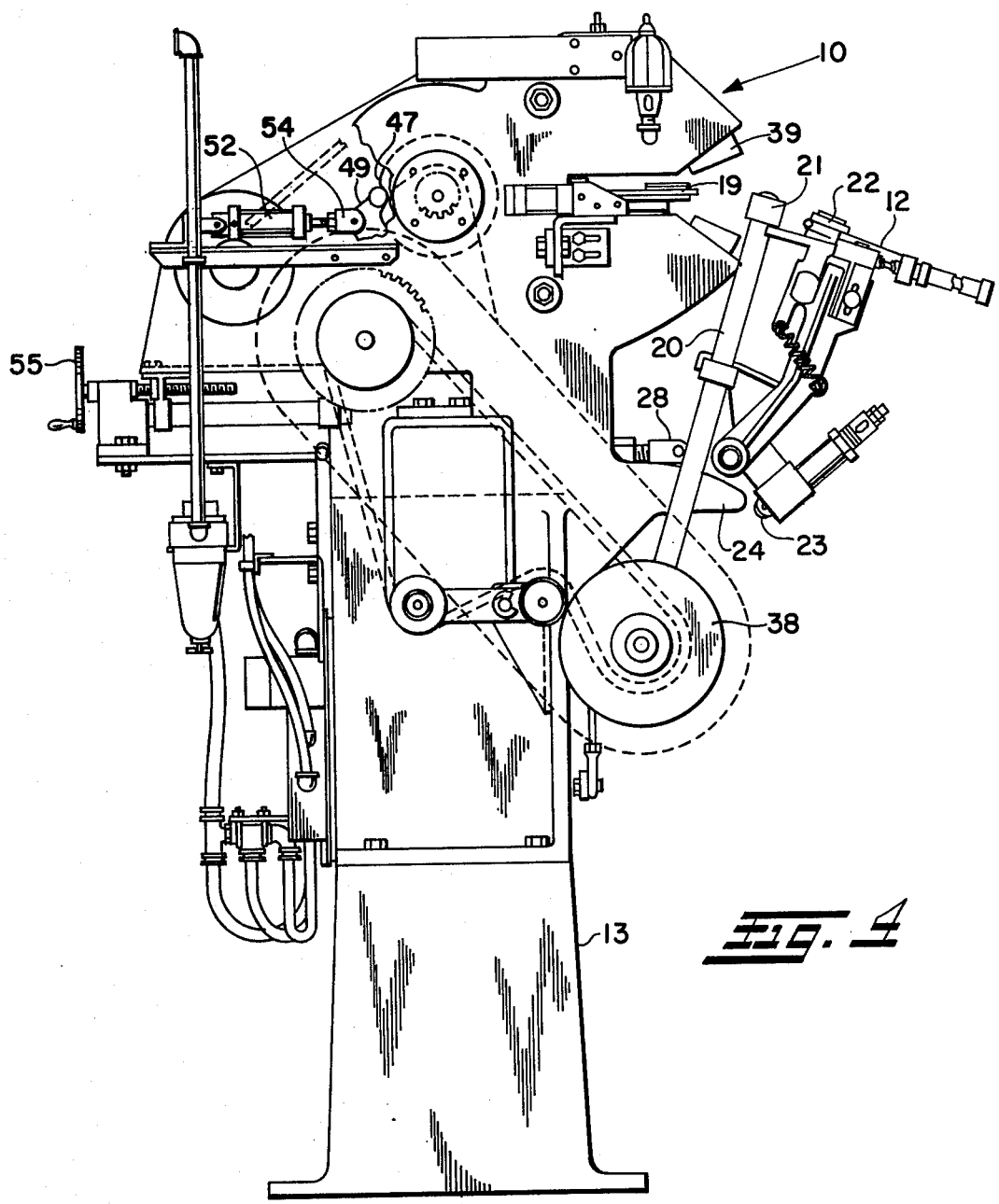
FIG. 4 is a left side view of the machine.

An electric motor 29, mounted on the machine stand 13, is operatively connected to the BRA 14 to rotate the head 21 of the shaft 20. A drive pulley 30 is secured to the protruding shaft 31 of a conventional clutch and electro-brake device 32 which, in turn, is mounted on the protruding shaft of the electric motor 29. A good clutch and brake device 32 is one manufactured by the Warner Electric Company of Beloit, Wisconsin. A clutch and electro-brake device 32 of this type employs a first disc which is keyed to the rotating shaft of the electric motor 29, and a second disc which is secured so that it will not rotate. A magnetic field is developed to move the rotating disc against the stationary disc to stop operation of the electric motor 29 and machine 10. It can be appreciated that the rotatable disc of the electro-brake 32 is akin to a brake drum, whereas the stationary disc is like a brake shoe. The clutching mechanism of the device 32 is used to engage and disengage the rotating shaft of the electric motor 29 from the rotatable shaft 31 of the device 32. As best seen in FIGS. 1 and 4, the rotatable head 21 of the BRA 14 is coupled to the pulley 30 of the electric motor 29 by a series of interacting gears, pulleys, and connecting drive belts.

Assembly for Controlling the Rotational Speed of the Tire Beads

The assembly 17 for varying the rotational speed of the tire beads 12 comprises a hand-operated lever 35 which is rotated to different arcuate positions for changing the spacing between the outer ends 36 and 37 of the drive pulley 38 to literally change the diameter of the drive pulley 38 and, accordingly, vary the speed at which the drive pulley 38 and connected head 21 rotate.

Assembly for Wrapping the Tire Bead

The assembly 15 for wrapping the continuous element 11 around the rotating bead 12, hereafter referred to as the bead wrapper assembly or BWA 15, comprises an annular carriage or shuttle 39 with a pie-shape portion 40 thereof removed for receiving the tire bead 12. The shuttle 39 is rotatable in a fixed plane and about a fixed center axis. The shuttle 39 is likewise coupled to the drive pulley 30 of the electric motor 29 by a series of interacting pulleys and connecting drive belts. The shuttle 39 carries a spindle 41 for rotatably supporting a spool 42 on which the continuous element 11 is helically wound. The continuous element 11 is taken from the spool 42, reeved around a guide pulley 43, and threaded on a finger guide 44 which is adapted to receive differently sized continuous elements, such as a tape or cord. The finger guide 44 comprises two guide rolls 45, 46 between which the continuous element 11 passes. The shuttle 39 has an outer periphery with projecting gear teeth for meshing engagement with other toothed gears which, in turn, are coupled to a latching mechanism which is part of the brake assembly 16.

Assembly for Braking and Stopping Operation of the Machine

The assembly 16 for braking and stopping operation of the machine, hereafter referred to as the brake assembly 16, besides including the electro-brake 32, includes a latching mechanism in the form of a circular cam 47 which is geared for rotation, in unison, with the shuttle 39. The cam 47 has a specially configured V-shaped recess 48 for receiving a cam follower 49 comprised of a roller 50 which is rotatably mounted on the free end of an L-shaped lever arm 51 that is pivotally mounted on the machine stand 13 adjacent the cam 47. An air cylinder 52 and reciprocating piston 53 are coupled between the cam follower 49 and machine stand 13 to rotate the cam follower 49 into and out of latching engagement with the cam 47. The V-shaped recess 48 is rounded to matingly conform to the curvature of the roller 50. The outer corners of the recess 48 are also rounded to facilitate movement of the roller 50 into and out of the V-shaped recess 48. The cam 47 is designed to override the cam follower 49 when it is rotating too fast, i.e. above a desired rotational speed.

Assembly for Controlling the Wrapping of the Tire Bead

The assembly 18 for regulating the wrapping of the tire bead, by controlling the rotational speed of the shuttle 39, comprises a hand wheel 55 for varying the diameter of the main drive pulley in the drive chain of the BWA 15.

Assembly for Cutting the Continuous Element

Figure 5:
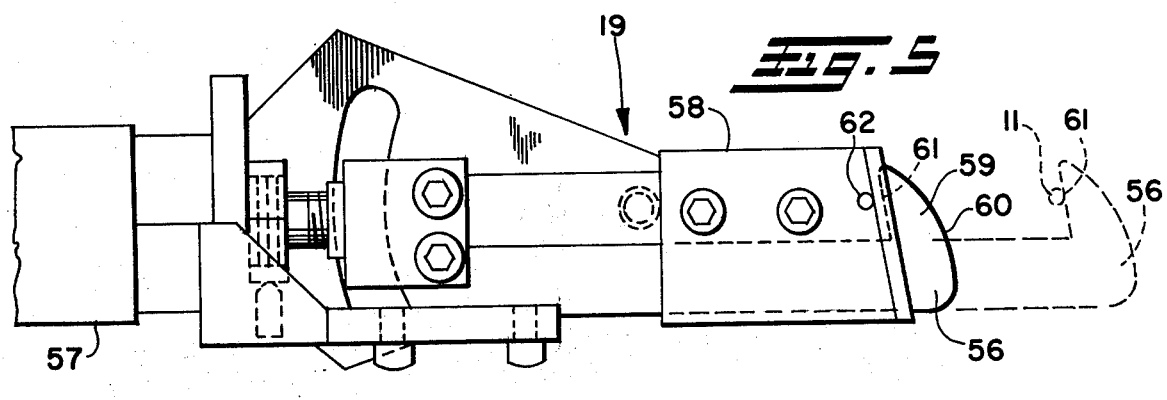
FIG. 5 is an enlarged view of the knife assembly of the machine.

The assembly 19 (FIG. 5) for cutting the continuous element 11, hereafter referred to as the knife assembly 19, comprises a sharp knife or blade 56 which is coupled to an air cylinder 57 that is used to reciprocate the knife 56 to and from a stationary holder 58 for housing the knife blade 56. A hook 59 is formed in the free outer end 58 of the knife 56 protruding from the holder 58. The knife 56 when actuated, moves outwardly from the holder 58 to a point where the hook 59 passes beyond the continuous element 11. The curved, outer edge 60 of the hook 59 deflects the element 11 which finally comes to rest adjacent the inside cutting edge 61 of the hook 59, as shown in dotted line of FIG. 5. The continuous element 11 is cut by the sharp edge 61 of the hook 59 when the knife 56 moves back into the holder 58 and comes to rest against the roll pin 62. The cut end of the element 11, carried by the finger guide 44, is retained by the knife 56 and holder 58, until the shuttle 39 begins rotating, at which time the rotating finger guide 44 will pull the cut end of the element 11 from between the knife 56 and holder 58. Thus, the operator of the machine 10 will not have to reach into the shuttle to retrieve the loose cut end for starting the wrap of a new bead, as has been done in the past.

Figure 3:
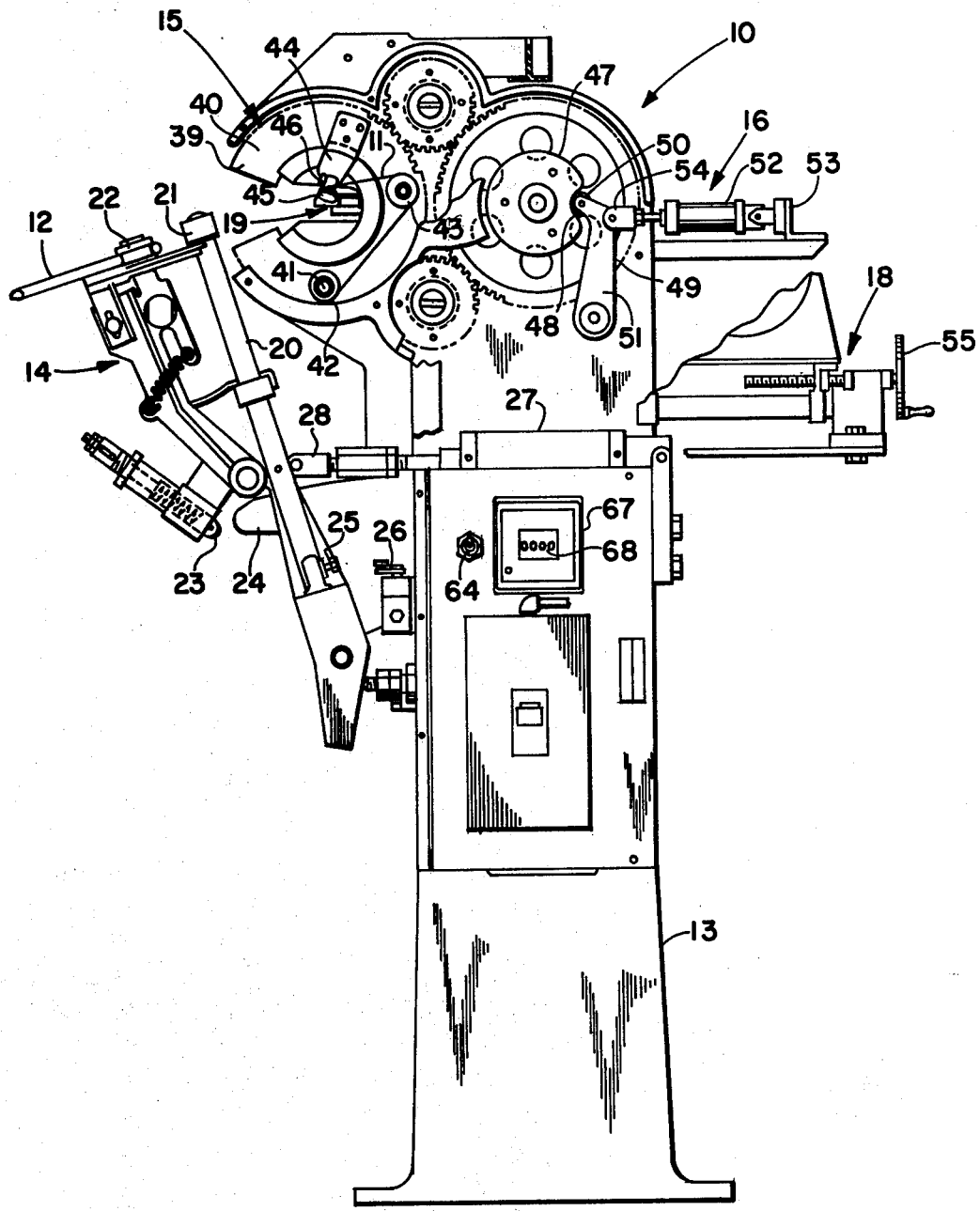
FIG. 3 is a right side view of the machine.

As has been previously explained, the brake assembly 16 is designed to cushion the stop of the main moving parts of the machine 10, especially the rotating shuttle 39, so that they will not come to an abrupt halt. For this reason, the cam 47 has been designed to override the cam follower 49 if rotating too fast. Although the electro-brake 32 and latching mechanism 47, 49 of the brake assembly 16 cooperate to stop operation of the machine 10, it was discovered that the stoppage of the machine 10 was haphazard in that the shuttle 39 did not always come to rest in its desired position, as best seen in FIG. 3, where the roller 50 of the cam follower 49 is in the V-shaped recess 48 of the cam 47.

The Invention

Figure 6:
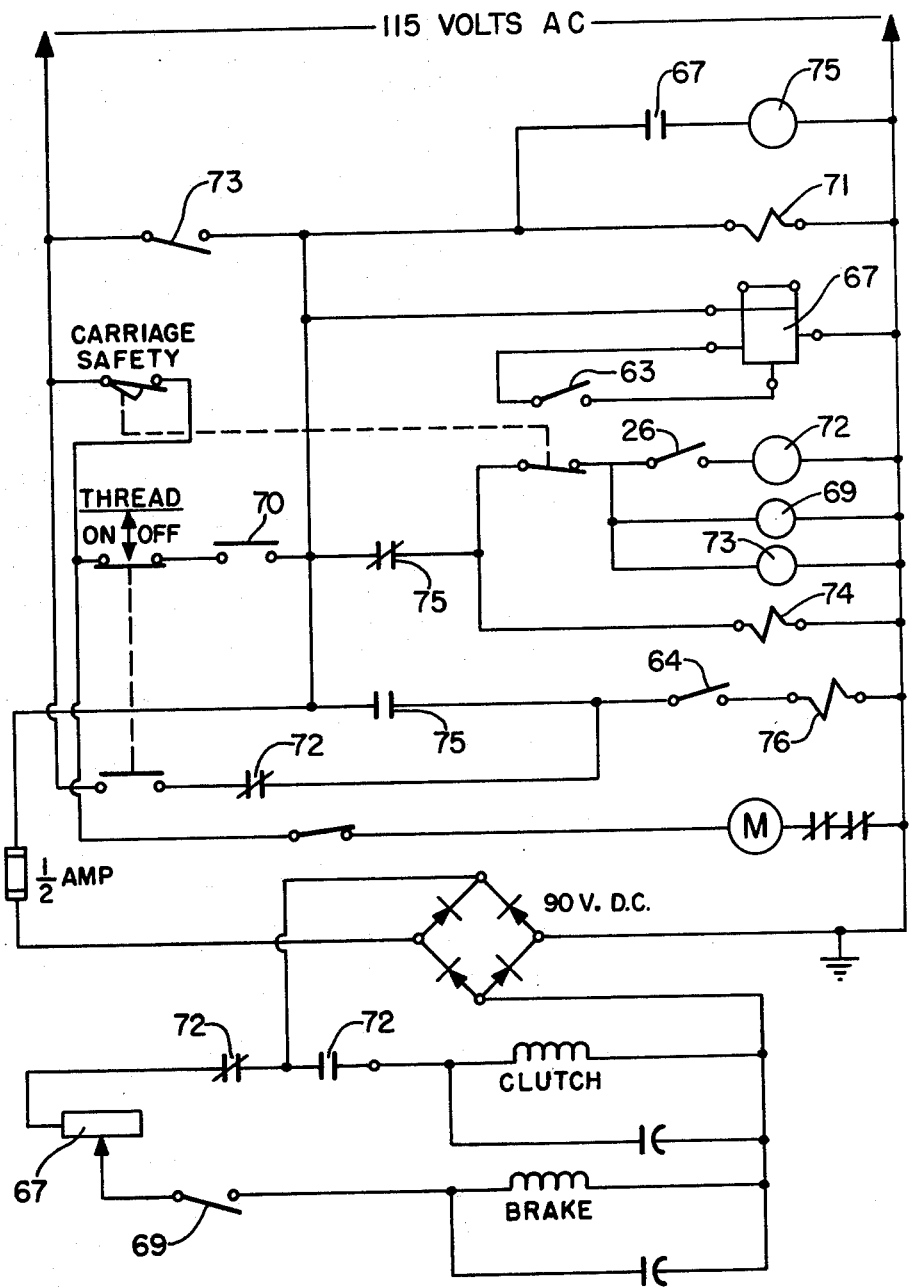
FIG. 6 is a schematic of the wiring of the machine.

It was determined to apply the electro-brake 32 for a predetermined length of time to slow down the rotation of the cam 47 sufficiently so that the roller 50 of the cam follower 49 always comes to rest in the configured recess 48 of the cam 47. This was accomplished by providing a pair of conventional vane switches 63, 64 (FIG. 2) for monitoring the rotation of a pair of vanes 65, 66 which are operatively connected to the drive mechanism of the shuttle 39, so that the vanes 65, 66 rotate, in unison, with the shuttle 39. One of the vane switches 64 counts the number of wrappings by sending an electrical impulse to a digital counter 67 (FIG. 3) for every rotation of the shuttle 39. The digital counter 67 provides a visual display 68 of the number of revolutions of the shuttle 39, or wrappings of the continuous element 11 around the rotating tire bead 12. The digital counter 67, just prior to the completion of the final wrap of the desired number of wraps, triggers operation of the electro-brake 32 and a conventional timer 69 (FIG. 6) for regulating the time of contact between the rotating and stationary discs of the electro-brake 32. The timer 69 causes disengagement of the discs of the electro-brake 32, after a period of time sufficient to slow down the rotation of the cam 47 so that the cam 47 will not override the cam follower 49; that is, the roller 50 of the cam follower 49 will always come to rest in the V-shaped recess 48 of the cam 47. This braking feature of the machine can further be explained by reference to FIG. 6 in a discussion of the operation of the machine 10.

Operation of the Machine

Assuming a spool 42 of a continuous element 11 is properly mounted and threaded on the shuttle 39, a tire bead 12 is properly positioned on the bead wrapper assembly 14, as shown in FIG. 3, and the free end of the continuous element is attached properly to the bead 12, then a start switch 70 is closed to begin operation of the machine 10. The start switch 70 actuates the starting mechanism M of the motor 29 and a solenoid 71 which commences operation of the air cylinder 27 to rotate the bead rotating assembly 14 into position where the tire bead 12 is adjacent the finger guide 44. The limit switch 26 is actuated by the pin 25 as the bead rotating assembly 14 moves into position. The limit switch 26 operates a control relay CR 72 for the clutch and electro-brake device 32, which is coupled between the electric motor 29 and the assemblies 14, 15 for rotating and wrapping the tire bead 12. The shuttle 39 starts rotating to wrap the continuous element 11 around the bead 12 which is also rotating at a speed that is correlated to the rotational speed of the shuttle 39. The vane switch 64 keeps track of the number of wrappings. Just prior to the final wrap, the digital counter 67 actuates operation of the electro-braking device 32 to slow down the rotating cam 47. Simultaneously, the brake release timer (TDDI) 69 and an end-of-cycle timer (TDD) 73 are operated for timing and releasing the braking action of the electro-brake device 32 when the cam 47 is sufficiently slowed down. A second solenoid 74 is actuated by the digital counter 67 (CTR) to operate the air cylinder 52 for moving the cam follower 49 into position for stopping the rotating cam 47. When the cam 47 comes to a halt, the second vane switch 63 is closed and reacts to operate a second control relay (CRI) 75 which controls a third solenoid 76 to begin operation of the knife assembly 18, whereby the knife 56 moves from its holder 58, hooks the continuous element 11 and brings the hooked element 11 back to the holder 58 where it is cut by the sharp edge 61 of the knife 56. The second control relay 75 reacts to move the bead rotating assembly 14 back to its rest position to release the wrapped bead 12 after the continuous element 11 is cut. The shaft 31 of the electro-brake device 32, has meanwhile been disengaged from the rotating shaft of the electric motor 29. The machine 10 is now ready for the placement of a new bead for wrapping.

Thus, there has been described a highly improved machine for wrapping a continuous element, such as a cord or tape, spirally around a tire bead.

What is claimed is:

1. A machine for spirally wrapping a continuous element, such as a cord or tape, around an annular tire bead, comprising:
    (a) means for holding an annular tire bead and rotating it in a fixed plane and at a predetermined speed;
    (b) means for guiding the continuous element from a source of supply toward the rotating tire bead;
    (c) means coacting with the guide means for receiving the element and wrapping it around the rotating bead at a rotational speed which is correlated to the rotational speed of the bead;
    (d) means for varying the rotational speeds of the bead and element therearound;
    (e) a knife for cutting the continuous element when a portion thereof is wrapped around the bead;
    (f) means for holding at least one of the cut ends of the continuous element after the element is cut by the knife;
    (g) a braking mechanism for stopping operation of the machine by stopping rotation of the bead and element, said mechanism comprising:
    (h) a first member which rotates when the machine is in operation;
    (i) a second member for engaging and stopping rotation of the first member;
    (j) a cam corotatable, with the first member;
    (k) a cam follower for rollably engaging the cam periphery and bringing it to a halt at a fixed arcuate position wherein the bead wrapping means (c) is positioned for beginning the wrap of another tire bead;
    (l) means coacting between the cam and cam follower for cushioning the half of the cam and for allowing the cam to override the cam follower when the cam is rotating greater than a predetermined rotational speed;
    (m) means correlated to the wrapping of the element around the bead, for actuating engagement of the braking members for a predetermined period of time to slow down the rotational speed of the cam; and
    (n) means for releasing engagement of the braking members when the rotational speed of the cam is sufficiently slowed that the cam follower will always halt rotation of the cam at said fixed arcuate position.

2. The machine of claim 1, wherein engagement between the braking members is initiated just prior to the completion of the final wrapping of the element around the bead.

3. The machine of claim 2, wherein the means for actuating engagement of the braking members includes:
    (I) a counter for monitoring the wrappings of the element around the bead;
    (II) means coacting with the counter for initiating movement of one of the braking members into contact with the other of the braking members;
    (III) a timer for monitoring the length of time the braking members contact; and
    (IV) means coacting with the timer for releasing contact of the braking members.

4. The machine of claim 3, which includes:
    (o) an electric motor;
    (p) means coupling the electric motor to the bead rotating means (a) and the bead wrapping means (c);
    (q) and the braking mechanism includes an electro-brake device having:
    (I) a rotatable disc and a non-rotatable disc as first and second members;
    (II) means for causing relative movement of the discs to bring them into engagement; and
    (III) means for causing engagement and disengagement of the discs.

5. The machine of claim 4, wherein the bead rotating means (a) includes:
    (I) a shaft with a rotatable head for engaging the bead;
    (II) a rotatable flange roll spaced from the rotatable head of the shaft;
    (III) a stationary projecting cam adjacent the shaft;
    (IV) a cam follower carried by the flange roll for engaging the fixed cam and rotating the flange roll towards the rotatable head of the shaft so as to compressively engage a tire bead positioned between the flange roll and rotatable head.

6. The machine of claim 5, wherein the bead wrapping means (c) includes:
    (I) an annular shuttle rotatable about a fixed axis, the shuttle having a pie-shaped portion thereof removed for receiving a tire bead; and
    (II) a finger guide carried by the shuttle for holding the continuous element as it is wrapped around the tire bead, the finger guide designed to accommodate differently sized elements, such as a cord or tape.

7. The machine of claim 6, wherein the cam (j) which is corotatable, with the first member of the braking mechanism, is circular and rotates about its center axis, and the means for cushioning the halt of said cam includes a V-shaped recess with rounded corners formed in said cam.

8. The machine of claim 7, wherein the cam follower (k) for engaging the rotatable cam (j) and bringing it to a halt at a fixed arcuate position, includes:

(I) an L-shaped arm pivotally mounted adjacent said rotatable cam (j);
(II) a roller carried by said arm for receipt in said recess of said rotatable cam, the curvature of the bottom of the V-shaped recess corresponding to the curvature of the roller; and
(III) means coupled to the arm for reciprocating the roller to and from the center axis of said circular cam.

9. The machine of claim 8, wherein the knife and means for holding at least one of the cut ends of the continuous element includes:
(I) a knife having a pair of opposing ends;
(II) a holder for covering sharpened edges of the knife;
(III) means coupled to one of the pair of opposing ends of the knife blade for reciprocating the knife to and from the continuous element when the element comes to rest upon stoppage of the machine;
(IV) a hook disposed at the other of the opposing ends of the knife closest the element when in said rest position, the hook having a pair of opposing surfaces, one of the pair of opposing surfaces closest the element when in said rest position being curved to deflect the element from its normal pathway when the knife blade is moved axially beyond said element, and the other of said pair of opposing surfaces being sharpened to cut the element when the knife blade is retracted into the holder.

10. Method of positioning a rotatable winding shuttle, in a closed tire bead ring wrapping machine, relative to bead holding and rotating means comprising driving the shuttle in rotation about its own axis at a predetermined angular speed, counting the revolutions of said shuttle while in said rotation, actuating braking means in response to a first predetermined number of the so-counted revolutions thereby decellerating said shuttle, and then actuating latching mechanism having a cooperable cam and a cushioned cam follower to stop and position said shuttle, relative to said bead holding and rotating means, and allowing said cam to override said cam follower if said cam is rotating faster than a predetermined speed.

* * * * *

UNITED STATES PATENT AND TRADEMARK OFFICE
CERTIFICATE OF CORRECTION

PATENT NO. : 4,097,321
DATED : June 27, 1978
INVENTOR(S) : Emmett J Kelly, Leonard R Smith It is certified that error appears in the above-identified patent and that said Letters Patent are hereby corrected as shown below:

Claim 1, line 63, "half" should read -- halt --.

Signed and Sealed this

Fifth Day of December 1978

[SEAL]

Attest:

RUTH C. MASON
Attesting Officer

DONALD W. BANNER
Commissioner of Patents and Trademarks